United States Patent [19]

Kirchner

[11] 4,440,417
[45] Apr. 3, 1984

[54] HITCH ASSEMBLY

[76] Inventor: Jerry K. Kirchner, 1314 - 13th St. S., Lethbridge, Alberta, Canada, T1K 1S9

[21] Appl. No.: 359,251

[22] Filed: Mar. 18, 1982

[51] Int. Cl.³ .............................................. B60D 1/00
[52] U.S. Cl. ................................ 280/478 R; 280/474; 280/491 R
[58] Field of Search ................... 280/474, 477, 478 R, 280/478 A, 478 B, 491 R, 491 B, 491 D, 504, 515

[56] References Cited

U.S. PATENT DOCUMENTS

| | | | |
|---|---|---|---|
| 1,575,773 | 3/1926 | Lambert | 280/449 |
| 2,341,528 | 2/1944 | Clark | 280/477 |
| 2,386,195 | 10/1945 | Clark | 280/477 |
| 2,791,443 | 5/1957 | Allard | 280/477 |
| 3,807,768 | 4/1974 | Jones | 280/478 B |
| 4,116,460 | 9/1978 | Drower | 280/478 R |

FOREIGN PATENT DOCUMENTS 2712960  9/1978  Fed. Rep. of Germany ... 280/478 R

*Primary Examiner*—Joseph F. Peters, Jr.
*Assistant Examiner*—Kenneth R. Rice
*Attorney, Agent, or Firm*—Stanley G. Ade

[57] ABSTRACT

A hitch assembly consists of a scissors action connectable between the clevis of a towed vehicle such as an implement or the like and between a towing vehicle such as a tractor or the like. One end of the scissors action is closed and pivotally connected to the clevis and the other end is also closed and connectable to the tractor draw bar or the like. A control plate is operatively connected between the scissors action intermediate the ends thereof and the connection to the tractor draw bar. One end of the scissors action is connected, for example, to the front aperture in the draw bar of the towing vehicle whereupon the tractor or towing vehicle is backed up relatively close to the clevis of the towed vehicle. The scissors action may then be extended and/or swung from side to side manually so that it aligns with the aperture in the clevis which may then be pinned into position. The tractor is then backed up, and stops on the control plate engage the sides of the rearwardly extending draw bar thus forcing the alignment of the clevis with the draw bar. When the scissors action is fully retracted, a spring loaded pin automatically engages through apertures in part of the scissors action, the draw bar and the control plate thus locking the hitch assembly in the towing position.

31 Claims, 12 Drawing Figures

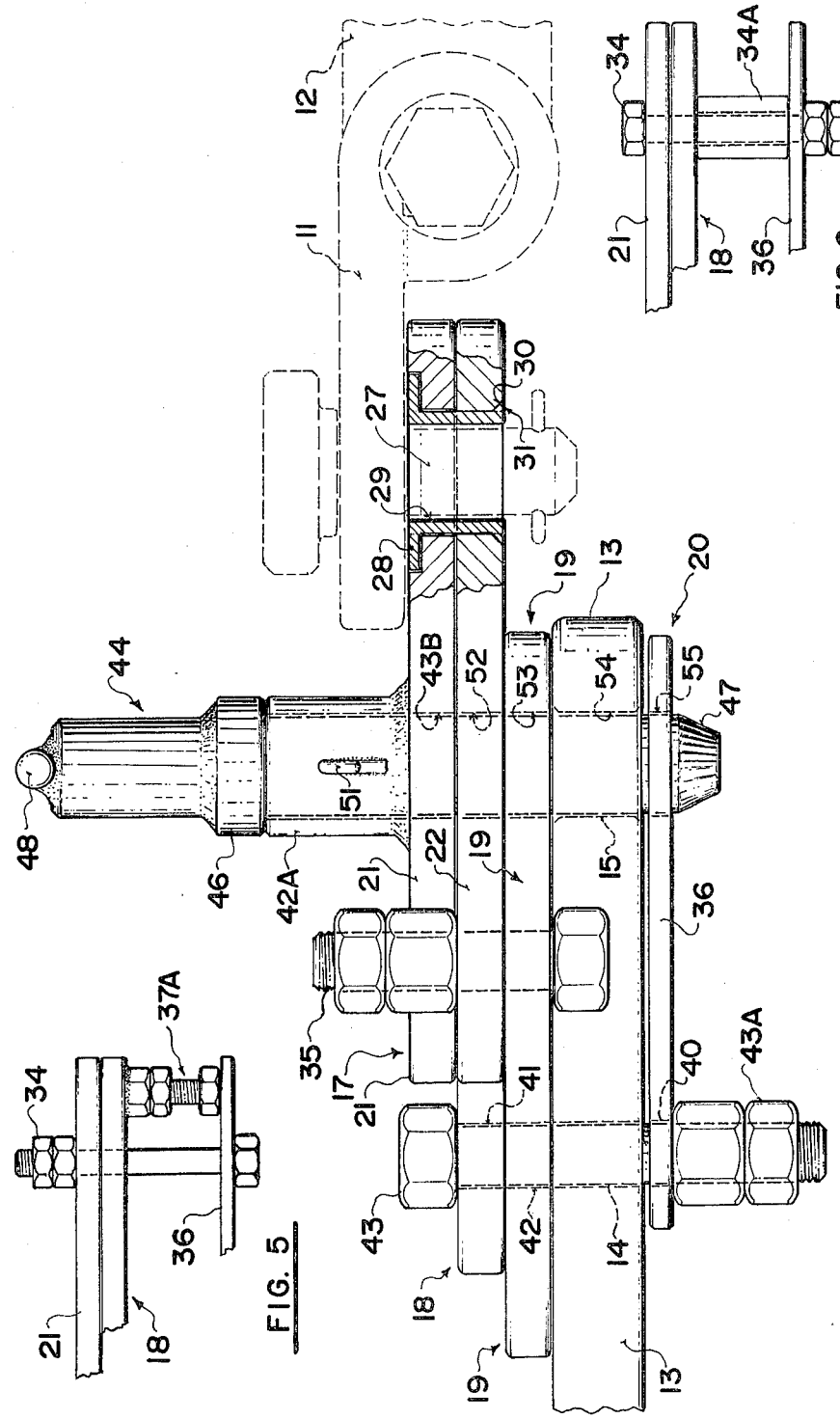

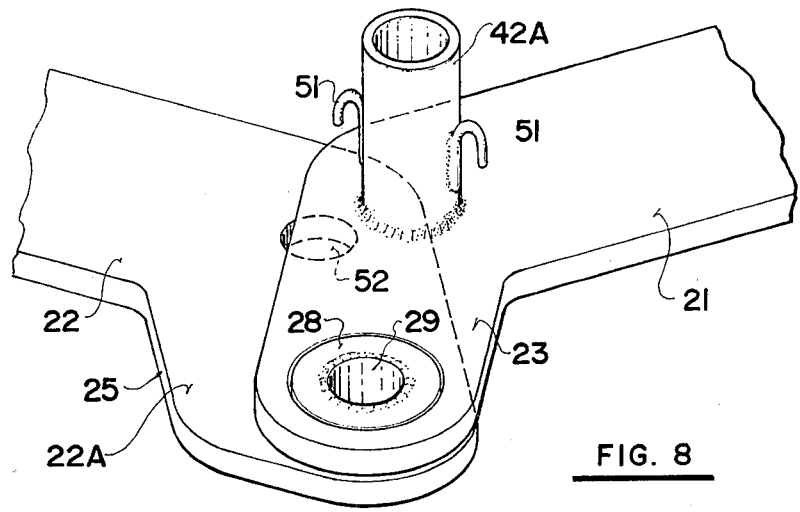
FIG. 8
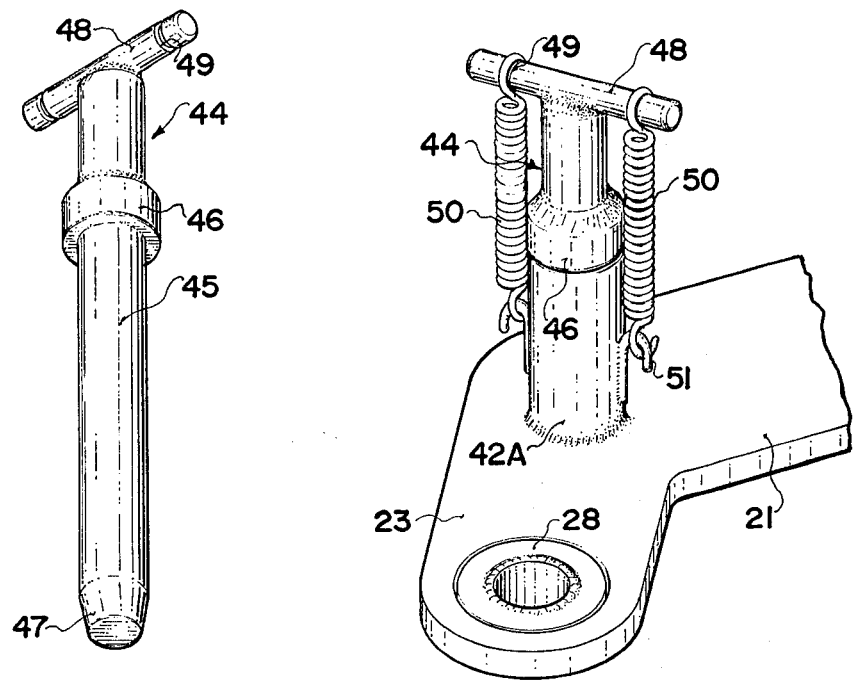
FIG. 10
FIG. 9

HITCH ASSEMBLY

BACKGROUND OF THE INVENTION

This invention relates to new and useful improvements in automatically aligning hitch assemblies designed to ease the connection of a towed device to a towing vehicle and although the present specification and drawings relate primarily to the connection between a tractor draw bar and an implement hitch, nevertheless it is readily adapted for use between a truck and trailer or a towing vehicle to anything requiring to be towed.

Difficulty exists in backing up the towing vehicle such as a tractor, to a towed device such as an implement, in a position so that the draw bar of the tractor, which is provided with an aperture, lines up exactly with the aperture in the corresponding clevis or hitch or the implement thus allowing a pin to be dropped through the tow bar and the hitch of the implement thereby connecting the two together. This problem is increased with the advent of tractor cabs being installed on modern tractors which cuts down the visibility.

It will be appreciated that the larger the equipment, the harder it is to judge due to the decreased visibility and distance from the connecting points. The same problem exists when attempting to hitch a truck or car to a trailer or implement as it is very difficult for the operator because the hitch is located at the centre of the rear bumper of the car or truck and is therefor not visible from the driver's seat.

Attempts have been made to overcome this disadvantage and one such solution is the provision of a mirror on the towing vehicle adjacent the hitch through which the operator may view the hitch, but this is also unsatisfactory.

Various other solutions have been attempted and U.S. Pat. No. 2,791,443 discloses one such solution which utilizes toggle arms and collapsible guide means.

U.S. Pat. No. 2,386,195 discloses a vehicle coupler which includes link means that collapse when the vehicle is coupled and U.S. Pat. No. 2,341,528 shows a similar structure.

U.S. Pat. No. 1,575,773 discloses a tractor hitch which includes pivoted arms and spring means for connecting the hitch, but they all suffer from several disadvantages and do not provide the flexibility of the present assembly nor do they provide the automatic locking of the hitch assembly in the retracted position once the initial manual connection has been made.

SUMMARY OF THE INVENTION

The present invention overcomes disadvantages inherent with existing structures by providing a device which allows the operator to back up to a towed device and to stop short by over a foot and to be off from centre to eithet side by over a foot. He may then leave the towing vehicle, lift a spring loaded pin and extend the hitch assembly and pivot it until it lines up with the tow bar of the towed device. A first pin may then be engaged to connect the hitch assembly to the towed device whereupon the towed device may be lowered by using the jack or stand of the towed device thus allowing the weight of the towed device to be taken up by the hitch assembly.

The operator then returns to the towing vehicle and backs same up which forces the hitch assembly to retract to its original position and to align the towed device with the draw bar of the towing vehicle. The spring loaded pin then automatically engages through the hitch assembly and the draw bar thus locking the hitch in the retracted position and permitting the towing to take place.

In accordance with the invention there is provided an adjustable hitch assembly for connecting a towed device such as an implement, trailer or the like, to a towing vehicle such as a car, truck, tractor or the like, said towed device including a tow bar, said towing vehicle including a draw bar having a front connecting means and a rear hitch connecting aperture spaced from said front connecting means; comprising in combination a scissors action having a rear hitch connection to the towed device at one end thereof and a front hitch connection to the towing vehicle at the other end thereof, a control plate operatively connected by one end thereof adjacent to a location intermediate the ends of the scissors action and connectable by the other end thereof to the front hitch connection at the other end of said scissors action, said scissors action being movable from a fully retracted position to a fully extended position and vice-versa and any position therebetween, stops on said control plate and on said scissors action engageable with the sides of the draw bar when installed thereon, to align the front connecting means with the rear connecting means when said scissors action is fully retracted and locking hitch means engageable through said scissors action and said rear hitch connecting aperture of said draw bar when said scissors action is fully retracted.

Another advantage of the invention is that it can be utilized with an apertured clevis on the towed device or, alternatively, can be readily adapted for use with a ball-type hitch component.

Another advantage of the invention is to provide a hitch assembly of the character herewithin described which may be made in various sizes, depending upon design parameters and the application within which it is to be used.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the Applicant and of the preferred typical embodiment of the principles of the present invention, in which:

DESCRIPTION OF THE DRAWINGS

FIG. 3 is a fragmentary side elevation of FIG. 2.

FIG. 5 is a fragmentary side elevation showing an alternate method of connection.

FIG. 6 shows a fragmentary side elevation of a yet further alternate method of connection.

FIG. 8 is a fragmentary isometric view of the connection between the crank arms of the scissors action.

FIG. 9 shows a fragmentary isometric view of one of the crank arms with the locking hitch pin assembly thereon.

FIG. 10 is an isometric view of the lock hitch pin per se.

In the drawings like characters of reference indicate corresponding parts in the different figures.

BRIEF DESCRIPTION OF THE INVENTION

Figure 1:
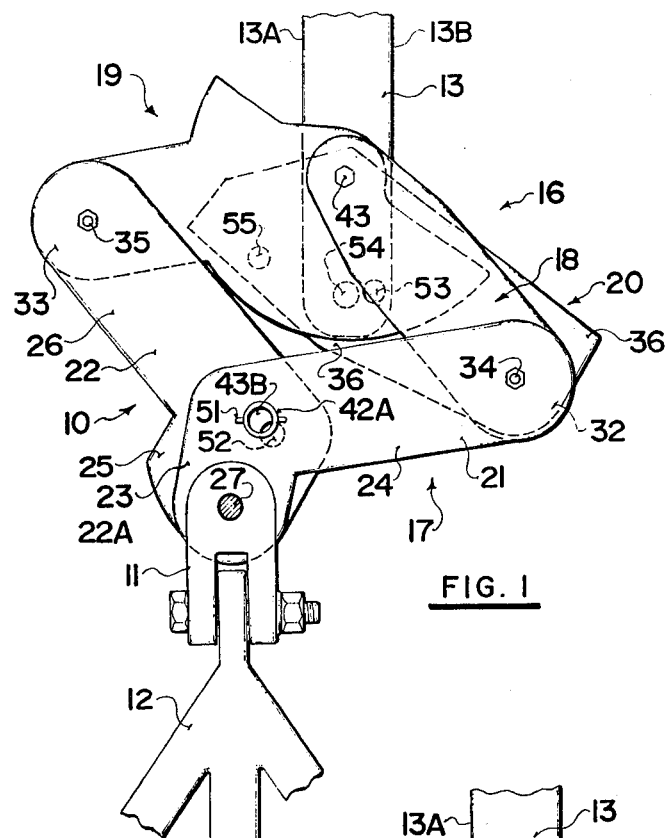
FIG. 1 is a top view of the device shown in the non-fully retracted position.

As mentioned previously, the hitch assembly collectively designated 10 is shown connected between a clevis 11 of an implement draw bar 12 and a tractor draw bar 13 which is normally provided with a front aperture 14 and a rear aperture 15 spaced a predetermined amount behind the front aperture 14.

The hitch assembly includes a scissors action collectively designated 16 comprising crank arm components collectively designated 17, links collectively designated 18 and 19, and a control plate collectively designated 20.

In detail, the crank arms 17 include the upper crank arm 21 and a lower crank arm 22. The upper crank arm includes a minor arm 23 and a major arm 24 extending substantially at right angles thereto. The crank arm 22 also includes a minor arm 25 and a major arm 26 extending also substantially at right angles thereto.

A pivotal connection is provided between adjacent the free ends of the minor arms 23 and 25 and this connection is shown in detail in FIG. 8. It constitutes the rear hitch connection of the scissors action 10 connectable to the clevis 11 by means of a conventional hitch pin 27. It consists of a hollow sleeve 28 with a flange 29 on the upper side recessed within the upper surface of the minor arm 23 of the crank arm member 21. The underside face of the arm 22 is also recessed as at 30 and receives the other end of the sleeve and is welded in position as at 31 with the surface being ground flush after welding thus providing a pivotal connection between the two crank arms 21 and 22 which are crossed with respect to one another so that when the inner or minor arms 23 and 25 move towards one another with respect to FIG. 8, the distal ends 32 and 33 of the major portions 24 and 26 move apart from one another and vice-versa.

Links 18 and 19 are pivotally connected by one end thereof to adjacent the distal ends 32 and 33 respectively of the crank arms by means of pivot pins 34 and 35 and these may take the form of nut and bolt assemblies or any other conventional form of pivotal connection thus forming the scissors action hereinbefore identified by reference character 16.

The connection of the other ends of the links to the draw bar will be hereinafter described.

Figure 4:
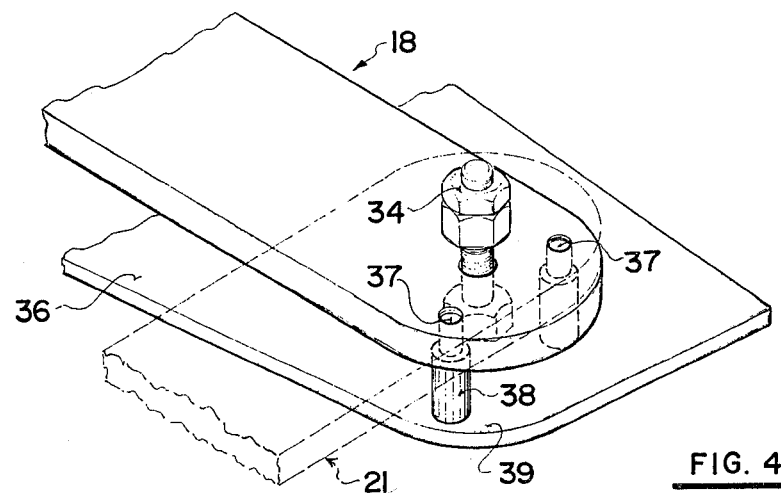
FIG. 4 is a fragmentary isometric view showing one of the preferred methods of connecting the locking plate with one of the links.
Figure 7:
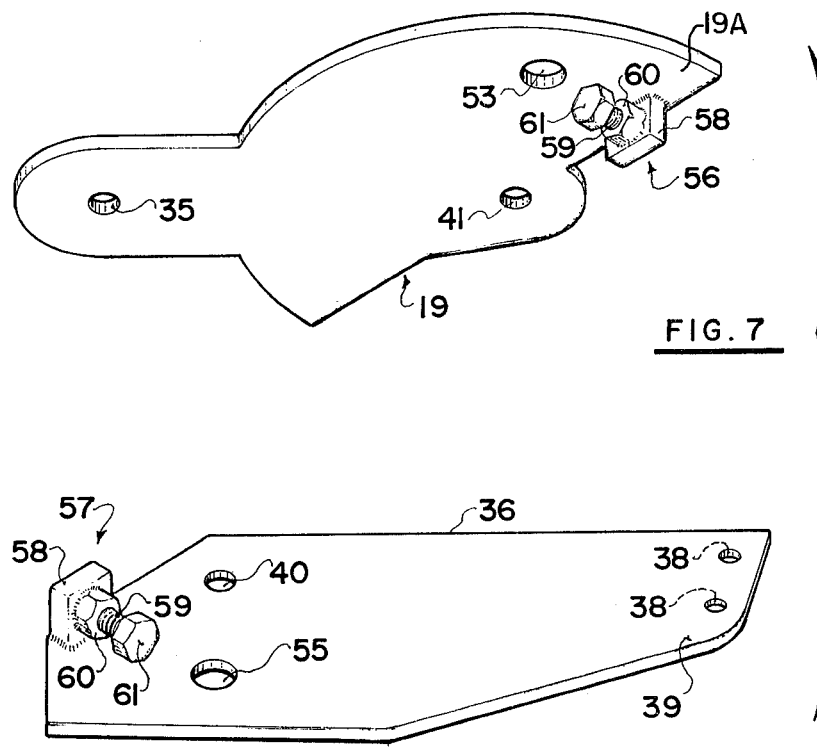
FIG. 7 shows an exploded isometric view of one of the link plates and the control plate with the stop means thereon.

Reference to FIGS. 1 and 7 will show a control plate 36 which is operatively connected between the junction or pivot 34 and the distal ends of the two links 18 and 19. This control plate is also connected adjacent the pivot pin 34 by one of three methods shown in FIGS. 4, 5 and 6 or any other method which provides the same form of connection. In FIG. 4, a pair of studs 37 engage through the link 18 slightly outboard of the pivot 34 with the upper ends made flush with the upper surface of the link so that the pivoting of the crank arm is not interfered with. Tubular spacers 38 engage around the studs 37 which extend through corresponding apertures adjacent the end 39 of the control plate 36 and nuts (not illustrated) engage the distal end of the studs thus holding the control plate in spaced and parallel relationship to the link 18, a sufficient distance so that the tractor draw bar 13 can engage therebetween as shown in FIG. 3.

FIG. 5 shows a nut and bolt assembly 37A extending from the link 18, outboard of the pivot 34, which is adjustable in length so that the head of the bolt engages the surface of the control plate 36 thus spacing them apart and being locked in position by a lock nut on the bolt shank. The pivot bolt 34 is also adjusted in effective length as necessary.

FIG. 6 shows a spacer sleeve 34A surrounding the shank of the pivot 34 between the link 18 and the control plate thus maintaining the desired spacing therebetween.

An aperture 40 is formed through the control plate and when installed, aligns with corresponding apertures 41 and 42 adjacent the distal ends of the links 18 and 19 (see FIG. 3). When aligned, a conventional hitch pin 43 may engage through the apertures 41 and 42 in the links 18 and 19, through the front aperture 14 in the tractor draw bar and through the aperture 40 in the control plate to be detachably secured by any conventional means such as nut and lock nut 43A.

When connected to the tractor draw bar by the first hitch pin 43 and situated adjacent but not aligned with the clevis 11, the rear hitch connection or sleeve 28 of the scissors action may be extended and/or moved from side to side until the sleeve 28 is aligned with the clevis aperture so that the hitch pin 27 may be engaged.

As an example, the scissors action may extend as much as twelve to eighteen inches or more and from side to side by a similar amount, depending upon design parameters thus giving considerable flexibility in the manual initial alignment of the hitch assembly with the aperture of the clevis of the draw bar of the implement.

Reference to FIGS. 3, 9 and 10 show the main locking hitch pin assembly. It consists of a sleeve 42A secured to and extending upwardly from the uppermost crank arm 21 adjacent the junction of the minor and major arms thereof with an aperture 43B extending through this junction aligned with sleeve 42A.

The locking pin collectively designated 44 consists of a cylindrical stem 45 with a spacing or location sleeve 46 secured thereto and having a chamfered distal end 47 and a cross piece 48 spanning the other end thereof which in turn is provided with a pair of annular grooves 49, all clearly shown in FIG. 10.

Tension springs 50 (see FIG. 9) engage by one end thereof within the annular grooves 49 and by the other ends thereof, to hooks 51 extending from each side of the sleeve 42A, thus normally urging the pin downwardly with the lowermost position being controlled by engagement of the sleeve 46 with the upper end of sleeve 42A.

When the scissors action is in the non-fully retracted position, the lower end 47 of the pin rides on the upper surface of the lower crank arm 22 and an extension 22A.

However, when the hitch or scissors action is fully retracted, the spring 50 moves the pin downwardly through an aperture 52 adjacent the junction of the arms of the lower crank arm 22 and through an aperture 53 adjacent one end of the link 19, through the front aperture 54 of the trailer draw bar and through aperture 55 in the control plate, all of which are now aligned, thus locking the hitch assembly in the towing position.

Figure 2:
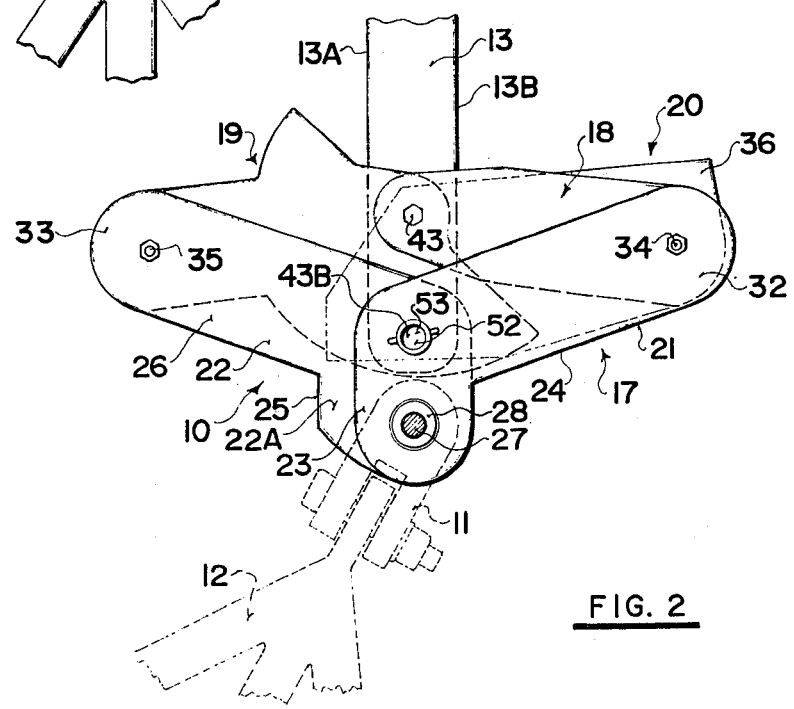
FIG. 2 is a view similar to FIG. 1, but showing the device fully retracted and locked.
Figures 1A, 1B:
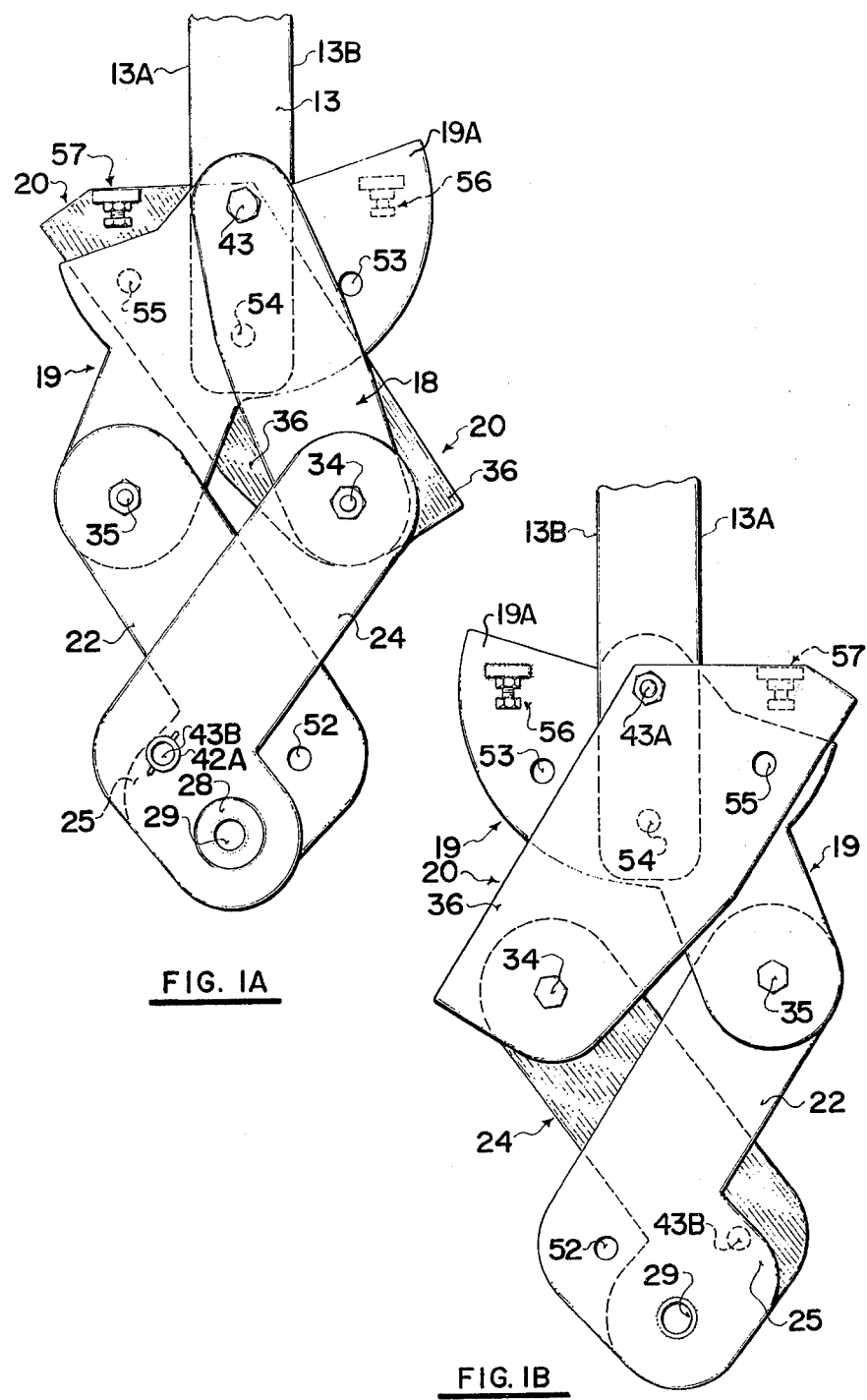
FIG. 1A is a top plan view showing the device in the nearly fully extended position.
FIG. 1B is an underside view of FIG. 1A.

The alignment of all of these apertures when the assembly is in the fully retracted position of FIG. 2, is controlled by stop means 56 and 57 on an extension 19A of the link 19 and the control plate 36 respectively with the stop means 56 being on the underside of link 19 and engaging side edge 13A of the draw bar and the stop means 57 being on the upper side of the control plate 36 and engaging the right hand side 13B of the draw bar with respect to FIGS. 1 and 2. FIG. 7 shows details of these stop means, each of which consists of a nut block 58 secured to and extending from the relevant surface of the portions 19 and 36. A headed bolt 59 screw threadably engages these nut blocks and lock nuts 60 lock the bolts in the desired position, it being understood that it is the bolt heads 61 which engage the sides of the draw bar when the hitch assembly is being moved to the fully retracted position.

Once the rear hitch pin 27 has been engaged within the sleeve 28 and the clevis 11 after the scissors action has been manually positioned, as hereinbefore described, the towing vehicle is backed up towards the towed implement 12 or the like and depending upon the relationship of the draw bar with the clevis 11 when initially hitched, stop means 57 or 58 will engage the side of the draw bar so that when fully retracted, both stop means will be engaging the sides of the draw bar and when both stop means do engage the sides of the draw bar and the hitch is fully retracted, the aforementioned apertures are aligned and the spring loaded pin 44 will automatically engage the apertures thus locking the hitch in the towing position.

When it is desired to unhitch, it is merely necessary to withdraw pin 27 and then lift pin 44 against pressure of spring 50 and swing the hitch sideways clear of the clevis of the draw bar of the implement.

Although the hitch assembly is shown connected to clevis 11 by means of hitch pin 27, nevertheless it will be appreciated that a conventional ball and socket connection can be provided at this point with the draw bar of the towing vehicle such as a truck or car, being similar to draw bar 13.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An adjustable hitch assembly for connecting a towed device such as an implement, trailer or the like, to a towing vehicle such as a car, truck, tractor or the like, said towed device including a tow bar, said towing vehicle including a draw bar having a front connecting means and a rear hitch connecting aperture spaced from said front connecting means; comprising in combination a scissors action having a rear hitch connection to the towed device at one end thereof and a front hitch connection to the towing vehicle at the other end thereof, a control plate operatively connected by one end thereof adjacent to a location intermediate the ends of the scissors action and connectable by the other end thereof to the front hitch connection at the other end of said scissors action, said scissors action being movable from a fully retracted position to a fully extended position and vice-versa and any position therebetween, stops on said control plate and on said scissors action engageable with the sides of the draw bar when installed thereon, to align the front connecting means with the rear connecting means when said scissors action is fully retracted and locking hitch means engageable through said scissors action and said rear hitch connecting aperture of said draw bar when said scissors action is fully retracted.

2. The assembly according to claim 1 in which said scissors action includes a pair of crank arm members pivotally connected together by one end of one arm of each of said crank arms thereby constituting said rear hitch connection to the towed device, a link pivotally connected by one end thereof to the distal ends of each of said crank arms, means for operatively engaging the other ends of said links together and thus constituting said front hitch connection to the towing vehicle.

3. The assembly according to claim 1 in which said stop means are adjustable.

4. The assembly according to claim 2 in which said stop means are adjustable.

5. The assembly according to claim 1 in which said locking hitch means includes a locking pin mounted adjacent the rear end of said scissors action for selective movement through said scissors action and said draw bar, perpendicular to the plane thereof, means mounting said locking hitch means, said last mentioned means including a sleeve secured on the upper side of said scissors action and extending upwardly therefrom, said locking pin slidably engaging said sleeve, and spring means coacting between said pin and said sleeve normally urging said pin downwardly through said scissors action and said draw bar and apertures in said scissors action and said draw bar to receive said pin.

6. The assembly according to claim 2 in which said locking hitch means includes a locking pin mounted adjacent the rear end of said scissors action for selective movement through said scissors action and said draw bar, perpendicular to the plane thereof, means mounting said locking hitch means, said last mentioned means including a sleeve secured on the upper side of said scissors action and extending upwardly therefrom, said locking pin slidably engaging said sleeve, and spring means coacting between said pin and said sleeve normally urging said pin downwardly through said scissors action and said draw bar and apertures in said scissors action and said draw bar to receive said pin.

7. The assembly according to claim 3 in which said locking hitch means including a locking pin mounted adjacent the rear end of said scissors action for selective movement through said scissors action and said draw bar, perpendicular to the plane thereof, means mounting said locking hitch means, said last mentioned means including a sleeve secured on the upper side of said scissors action and extending upwardly therefrom, said locking pin slidably engaging said sleeve, and spring means coacting between said pin and said sleeve normally urging said pin downwardly through said scissors action and said draw bar and apertures in said scissors action and said draw bar to receive said pin.

8. The assembly according to claim 4 in which said locking hitch means including a locking pin mounted adjacent the rear end of said scissors action for selective movement through said scissors action and said draw bar, perpendicular to the plane thereof, means mounting said locking hitch means, said last mentioned means including a sleeve secured on the upper side of said scissors action and extending upwardly therefrom, said locking pin slidably engaging said sleeve, and spring means coacting between said pin and said sleeve normally urging said pin downwardly through said scissors action and said draw bar and apertures in said scissors action and said draw bar to receive said pin.

9. The assembly according to claim 6 which includes an extension portion on one of said crank arms to receive and support the lower end of said pin in sliding relationship when said scissors action is in the non-fully retracted position.

10. The assembly according to claim 8 which includes an extension portion on one of said crank arms to receive and support the lower end of said pin in sliding relationship when said scissors action is in the non-fully retracted position.

11. The assembly according to claim 1 in which said control plate is spaced and parallel to said scissors action, said draw bar slidably engaging therebetween.

12. The assembly according to claim 2 in which said control plate is spaced and parallel to said scissors action, said draw bar slidably engaging therebetween, said locking hitch means including a locking pin being engageable through said crank arms, through one of said links, through said draw bar and through said control plate.

13. The assembly according to claim 3 in which said control plate is spaced and parallel to said scissors action, said draw bar slidably engaging therebetween.

14. The assembly according to claim 4 in which said control plate is spaced and parallel to said scissors action, said draw bar slidably engaging therebetween, said locking hitch means including a locking pin being engageable through said crank arms, through one of said links, through said draw bar and through said control plate.

15. The assembly according to claim 5 in which said control plate is spaced and parallel to said scissors action, said draw bar slidably engaging therebetween.

16. The assembly according to claim 6 in which said control plate is spaced and parallel to said scissors action, said draw bar slidably engaging therebetween, said locking pin being engageable through said crank arms, through one of said links, through said draw bar and through said control plate.

17. The assembly according to claim 7 in which said control plate is spaced and parallel to said scissors action, said draw bar slidably engaging therebetween.

18. The assembly according to claim 8 in which said control plate is spaced and parallel to said scissors action, said draw bar slidably engaging therebetween, said locking pin being engageable through said crank arms, through one of said links, through said draw bar and through said control plate.

19. The assembly according to claim 9 in which said control plate is spaced and parallel to said scissors action, said draw bar slidably engaging therebetween.

20. The assembly according to claim 10 in which said control plate is spaced and parallel to said scissors action, said draw bar slidably engaging therebetween, said locking pin being engageable through said crank arms, through one of said links, through said draw bar and through said control plate.

21. The assembly according to claim 2 in which each of said crank arm members includes a major arm and a minor arm extending from said major arm at substantially right angles thereto, said crank arms being pivotted together adjacent the ends of said minor arms, said crank arms crossing one another whereby as said minor arms approach one another, the distal ends of said major arms move apart from one another and vice-versa, said locking hitch means being situated adjacent the junction of said major and minor arms of said crank arm members.

22. The assembly according to claim 6 in which each of said crank arm members includes a major arm and a minor arm extending from said major arm at substantially right angles thereto, said crank arms being pivotted together adjacent the ends of said minor arms, said crank arms crossing one another whereby as said minor arms approach one another, the distal ends of said major arms move apart from one another and vice-versa, said locking hitch means being situated adjacent the junction of said major and minor arms of said crank arm members.

23. The assembly according to claim 9 in which each of said crank arm members includes a major arm and a minor arm extending from said major arm at substantially right angles thereto, said crank arms being pivotted together adjacent the ends of said minor arms, said crank arms crossing one another whereby as said minor arms approach one another, the distal ends of said major arms move apart from one another and vice-versa, said locking hitch means being situated adjacent the junction of said major and minor arms of said crank arm members.

24. The assembly according to claim 10 in which each of said crank arm members includes a major arm and a minor arm extending from said major arm at substantially right angles thereto, said crank arms being pivotted together adjacent the ends of said minor arms, said crank arms crossing one another whereby as said minor arms approach one another, the distal ends of said major arms move apart from one another and vice-versa, said locking hitch means being situated adjacent the junction of said major and minor arms of said crank arm members.

25. The assembly according to claim 2 in which said rear hitch connection includes a hollow sleeve pivot, for detachably receiving a hitch pin to connect said hitch assembly to the tow bar of said towed device.

26. The assembly according to claims 12, 14 or 16 which includes means to connect said control plate to adjacent the pivotal connection of one of said links with the distal end of one of said crank arm members, said last mentioned means including a pair of spaced apart nut and bolt assemblies extending between said control plate and said one link and spacer sleeves around said bolts to maintain the control plate and said one link in the desired spaced apart relationship.

27. The assembly according to claims 18, 20 or 22 which includes means to connect said control plate to adjacent the pivotal connection of one of said links with the distal end of one of said crank arm members, said last mentioned means including a pair of spaced apart nut and bolt assemblies extending between said control plate and said one link and spacer sleeves around said bolts to maintain the control plate and said one link in the desired spaced apart relationship.

28. The assembly according to claims 12, 14 or 16 which includes means to connect said control plate to adjacent the pivotal connection of one of said links with the distal end of one of said crank arm members, said last mentioned means including a pair of spaced apart nut and bolt assemblies extending between said control plate and said one link, and lock nut means on said nut and bolt assemblies to detachably secure said nut and bolt assemblies at the desired length thereby maintaining the spacing between said control plate and said one link.

29. The assembly according to claims 18, 20 or 22 which includes means to connect said control plate to adjacent the pivotal connection of one of said links with the distal end of one of said crank arm members, said last mentioned means including a pair of spaced apart nut and bolt assemblies extending between said control plate and said one link, and lock nut means on said nut and bolt assemblies to detachably secure said nut and bolt assemblies at the desired length thereby maintaining the spacing between said control plate and said one link.

30. The assembly according to claims 12, 14 or 16 which includes means to connect said control plate to adjacent the pivotal connection of one of said links with the distal end of one of said crank arm members, said last mentioned means including a pivot pin connecting said one link and said one crank arm component together and extending through said control plate and a spacer sleeve around the portion of said pivot pin between said one link and said control plate to maintain same in the desired spaced apart relationship.

31. The assembly according to claims 18, 20 or 22 which includes means to connect said control plate to adjacent the pivotal connection of one of said links with the distal end of one of said crank arm members, said last mentioned means including a pivot pin connecting said one link and said one crank arm component together and extending through said control plate and a spacer sleeve around the portion of said pivot pin between said one link and said control plate to maintain same in the desired spaced apart relationship.

* * * * *